United States Patent [19]
Treharne

[11] Patent Number: 5,703,413
[45] Date of Patent: Dec. 30, 1997

[54] METHOD FOR OPERATING A VEHICLE SECURITY SYSTEM INCLUDING CODE COMPARISON AFTER STARTING WHICH COUNTS START ATTEMPTS

[75] Inventor: William David Treharne, Farmington Hills, Mich.

[73] Assignee: Ford Global Technologies, Inc., Dearborn, Mich.

[21] Appl. No.: 763,026

[22] Filed: Dec. 10, 1996

Related U.S. Application Data

[63] Continuation-in-part of Ser. No. 586,448, Jan. 16, 1996, Pat. No. 5,637,929.

[51] Int. Cl.$^6$ ................................................. B60R 25/04
[52] U.S. Cl. ................... 307/10.5; 180/287; 340/825.72
[58] Field of Search ........................... 307/9.1–10.6; 180/287; 340/425.5, 426, 825.3, 825.32, 825.34, 825.44, 825.69, 825.72; 364/423.098, 424.045, 424.034

[56] References Cited

U.S. PATENT DOCUMENTS

| | | | |
|---|---|---|---|
| 4,645,939 | 2/1987 | Robinson | 307/10.2 |
| 4,749,873 | 6/1988 | Mutoh et al. | 307/10.2 |
| 5,229,648 | 7/1993 | Sues et al. | 307/10.2 |
| 5,519,260 | 5/1996 | Washington | 307/10.5 |
| 5,519,376 | 5/1996 | Iijima | 307/10.2 |
| 5,539,260 | 7/1996 | Khangura et al. | 307/10.3 |
| 5,561,332 | 10/1996 | Udo et al. | 307/10.5 |
| 5,637,929 | 6/1997 | Treharne | 307/10.5 |

FOREIGN PATENT DOCUMENTS

| | | | |
|---|---|---|---|
| 8-133018 | 5/1996 | Japan | 307/10.5 |

Primary Examiner—Richard T. Elms
Attorney, Agent, or Firm—Mark Mollon

[57] ABSTRACT

A security system for an automotive vehicle having an engine is operatively connected between engine running electrical components that are connected to an electrical power source and a lock switch having at least two operative positions. The security system has a key with a memory device carried thereon with a first security code stored in the memory device. A theft control module having a memory storing a second security code is operatively connected between the switch and the engine running electrical devices. The theft control module operates to first permit the engine running electrical components to enable the starting of the engine and then to compare the first and second security codes. Before starting the engine, a counter is compared to a predetermined number so that the engine starting is limited to only a predetermined number of attempts. The engine is disabled if the number of attempts exceeds the predetermined number. An engine controller further transmits a challenge code to the theft control module which calculates a response code based on a secret algorithm which is sent to and compared to a calculated comparison code using the algorithm by the engine controller.

1 Claim, 3 Drawing Sheets

1

METHOD FOR OPERATING A VEHICLE SECURITY SYSTEM INCLUDING CODE COMPARISON AFTER STARTING WHICH COUNTS START ATTEMPTS

RELATED APPLICATIONS

This application is a continuation-in-part of U.S. application Ser. No. 08/586,448 filed Jan. 16, 1996, now U.S. Pat. No. 5,637,929.

BACKGROUND OF THE INVENTION

The present invention relates generally to a key-activated security system for an automotive vehicle and more specifically to a method and apparatus controlling the operation of the security system.

Security systems are known having two lines of defense. A first line of defense is a cut key that is able to operate the a lock switch if the key matches the lock into which it is inserted. A second line of defense uses electronic circuitry mounted in the key that transmits a unique identification code when activated. After a properly cut key is inserted into and turned in the lock, a security reader interrogates the electronic circuitry for its security code. If the security code matches an authorized code stored in the security reader, the engine is allowed to attempt to start.

The time required to start a vehicle once the driver turns the key to the start position includes both a delay for the electronic interrogation and the cranking and starting time of the engine. After a security code match is found, the time for actual starting of the engine varies depending on such factors as humidity and temperature. One problem with prior security systems is that if the engine does not start for a long duration after turning the key in the lock, drivers may incorrectly perceive a problem.

Another drawback with prior security devices is that when the vehicle fails to start, no indication of the cause of the problem is given. In other words, the driver does not know whether the car is not starting because of a fault in the security system or whether the car is not starting because of a defect in the engine or associated components.

U.S. Pat. No. 5,539,260 shows a key-mounted transponder storing a key code that is transmitted to a theft control module via an antenna. The theft control module allows the vehicle to attempt to start before checking for a valid key code in the transponder to eliminate the portion of the delay resulting from the interrogation of the transponder. One drawback of this patent is that the vehicle may be moved a short distance before the engine is disabled by subsequent failure to detect a valid key code. It may also be possible to sustain operation with the engine in a start mode by electronic tampering, allowing a thief to drive a vehicle away (albeit with poor engine performance).

SUMMARY OF THE INVENTION

An object of the invention is to prevent an unauthorized user from moving the vehicle more than a small amount while still allowing the system to compensate for sporadic failures to start the engine.

In one aspect of the invention, a key puts a lock switch in a selected position and an attempted start count is compared with a predetermined number. The engine is disabled from running if the attempted start count exceeds the predetermined number, otherwise starting of the engine is enabled. The attempted start count is then incremented.

The theft control module interrogates the key for the first security code. The first security code is compared with said second security code. If the first security code does not equal the second security code, then power to the running electrical components is disabled and the attempted start count is set to be greater than or equal to the predetermined number. If the first security code equals the second security code, then the electronic engine controller is signaled of the equality. A challenge code is generated in the electronic engine controller. The challenge code is transmitted to the theft control module. A response code is calculated in the theft control module based on a secret algorithm operating on the challenge code. The response code is transmitted to the electronic engine controller. The electronic engine controller calculates a comparison code based on the secret algorithm and compares the response code to the comparison code. If the comparison code equals the response code then the attempted start count is reset and power to the engine running electrical components is maintained, otherwise the power to the running electrical components is disabled and setting the attempted start count is set to be greater than or equal to the predetermined number.

DETAILED DESCRIPTION OF THE PREFERRED EMBODIMENT

Figure 1:
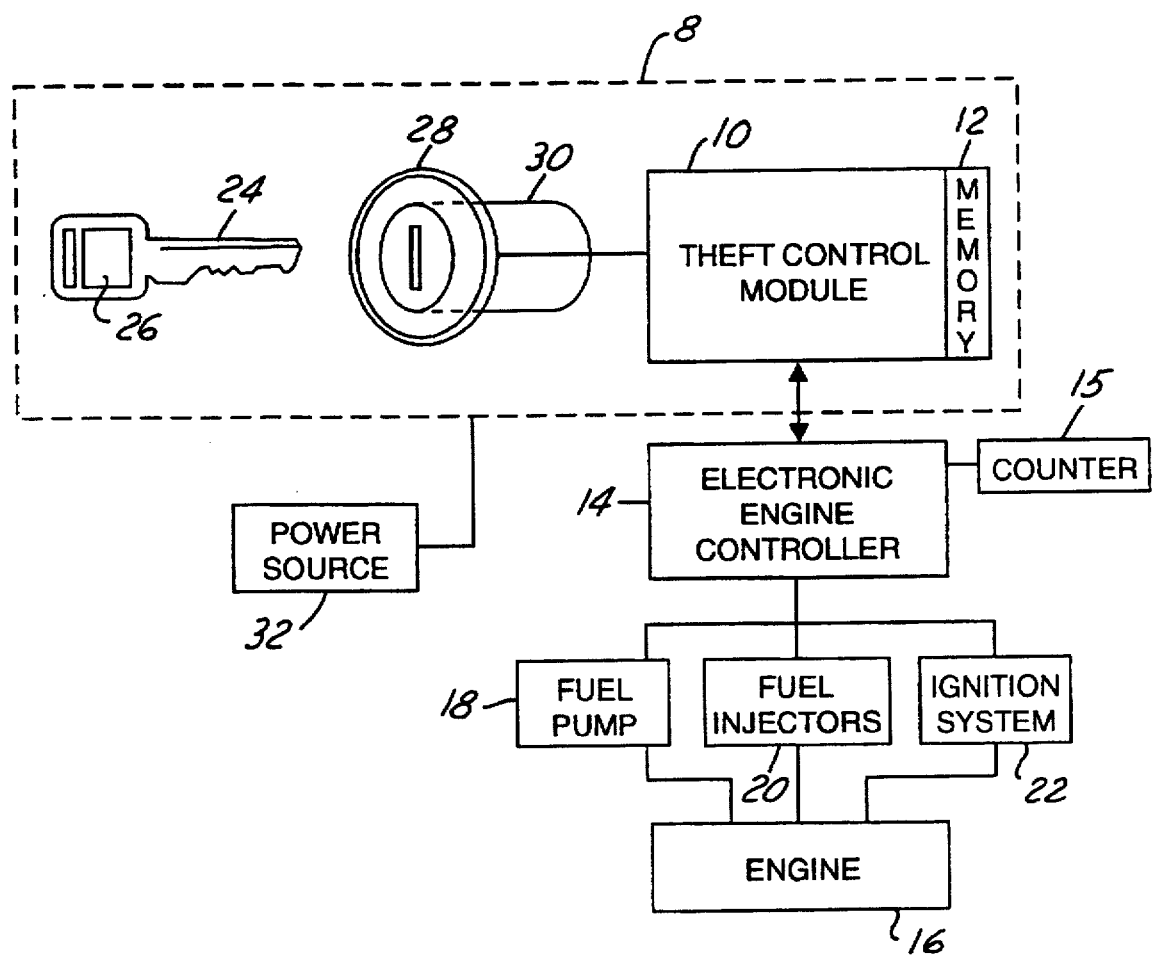
FIG. 1 is a block diagram of a security system according to the preferred embodiment of the invention.

Referring to FIG. 1, a security system 8 is connected to an electronic engine controller 14 and a power source 32. Electronic engine controller 14 receives power from power source 32 through security system 8. Security system 8 has a theft control module 10 with a memory 12.

Theft control module 10 is connected to an antenna 28 located around a lock switch 30 and is used to transmit and receive information to an electronic memory device such as a transponder 26 located on a key 24. Theft control module 10 is preferably microprocessor-based and has a variety of inputs and outputs for receiving and transmitting electrical signals.

Memory 12 of theft control module 10 stores a security code. Memory 12 is preferably a non-volatile memory such as an EEPROM. Keep-alive memory can also be used but requires constant power from the vehicle battery so that it does not lose its contents when ignition power is off (unless the battery is removed).

An attempted start counter 15 (preferably comprised of EEPROM) in engine controller 14 stores the number of start attempts of the engine. As will be described below, if the number of attempts exceeds a predetermined number, then the engine will no longer be permitted to operate until the challenge-response sequence is successfully completed.

Theft control module 10 is connected to electronic engine controller 14 that is also preferably microprocessor-based. Electronic engine controller 14 controls the functioning of an internal combustion engine 16 by controlling power supplied to engine running electrical components such as a fuel pump 18, fuel injectors 20, and an ignition system 22. Electronic engine controller 14 may also control other modules such as an intelligent fuel pump for a diesel engine.

Theft control module 10 and electronic engine controller 14 communicate using a series of control signals. As further described in conjunction with FIGS. 2A and 2B below, theft control module 10 provides a signal representing theft control status to electronic engine controller 14 consisting of engine disable and engine enable control signals. Theft control module 10 preferably uses an encoded digital control signal that is unique to individual vehicle systems. Providing a unique digital control signal decreases the ability of unauthorized persons to defeat the security system by disconnecting theft control module 10 from electronic engine controller 14 and providing a simulated control signal in place of a signal sent from theft control module 10.

Improved security is obtained by having engine controller 14 send a digital challenge code to theft control module 10. Both electronic engine controller 14 and theft control module 10 have the same secret algorithm stored within them. The secret algorithm is preferably unique to each vehicle and is comprised of a software routine plus another unique security code. Theft control module 10 receives the challenge code and processes the code according to the algorithm and returns a response code to engine controller 14. Engine controller 14 also processes the code it sent according to the secret algorithm. Engine controller 14 compares the received code to the comparison code it calculated. If the codes are equivalent, the engine stays enabled. If the codes are not equivalent the engine is disabled.

Carried within key 24 is a transponder including an electronic memory device that stores a security code. Key 24 is used to operate lock switch 30. Theft control module 10 sends an interrogating signal to antenna 28 that is located proximate to the lock switch 30. Lock switch 30, for example, is preferably a commonly known rotatable ignition switch having at least two positions, e.g., an "off" and an "on" position. Lock switch 30 can also provide several positions commonly used in ignition switch such as a start position and an accessory position. When lock switch 30 is in the "on" position, power source 32 supplies power to theft control module 10 and electronic engine controller 14. Antenna 28 provides magnetic coupling to transponder 26 that energizes transponder 26 so that it can transmit back its security code by way of antenna 28 to theft control module 10. Theft control module 10 compares the security code received from transponder 26 to a list of authorized security codes stored in memory 12. If the received security code is not equal to one of the security codes stored in memory 12, a disable engine control signal is sent to electronic engine controller 14.

Figure 2A:
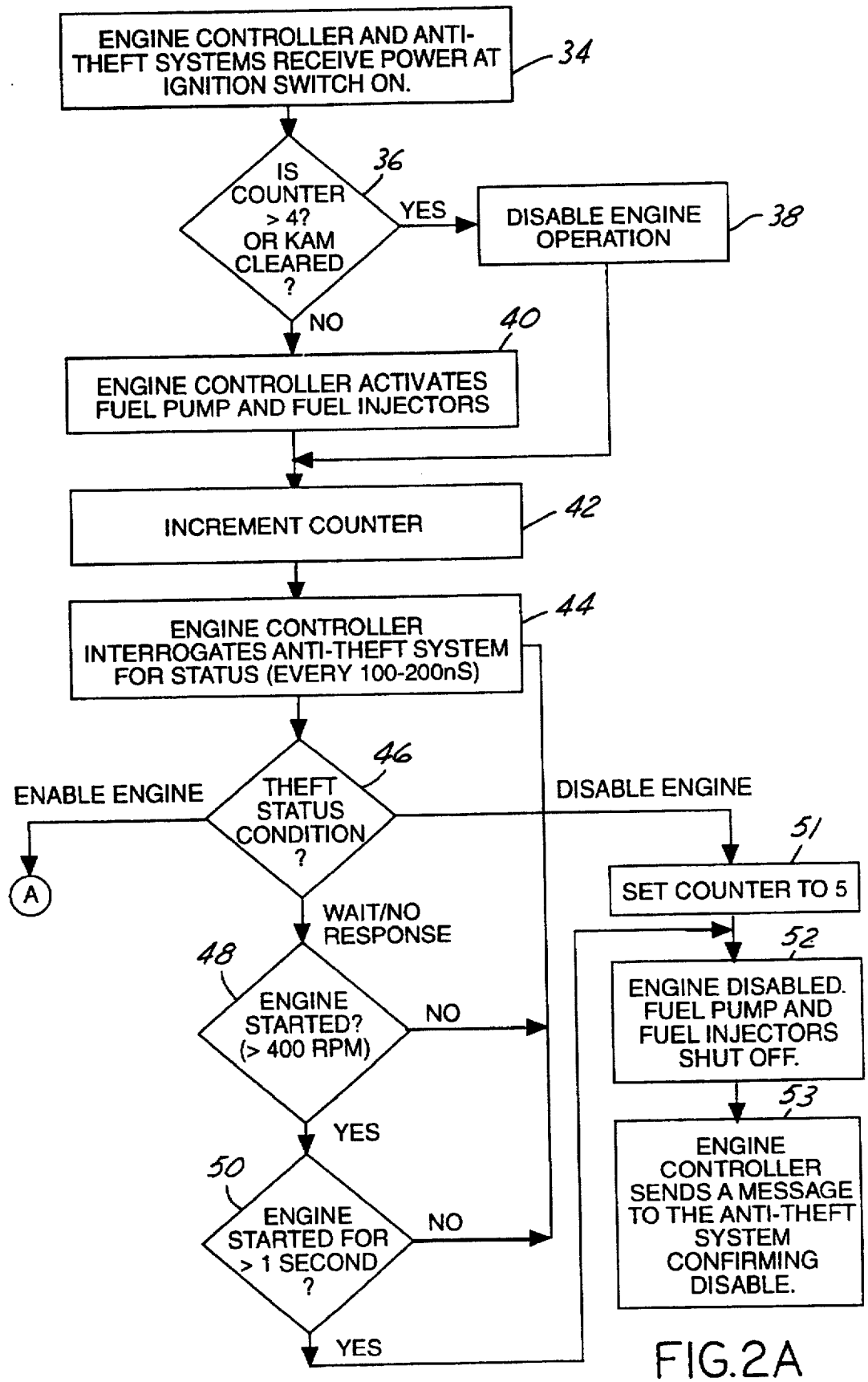
FIGS. 2A and 2B are flowcharts of the method for operating the security system according to the preferred embodiment of the invention.
Figure 2B:
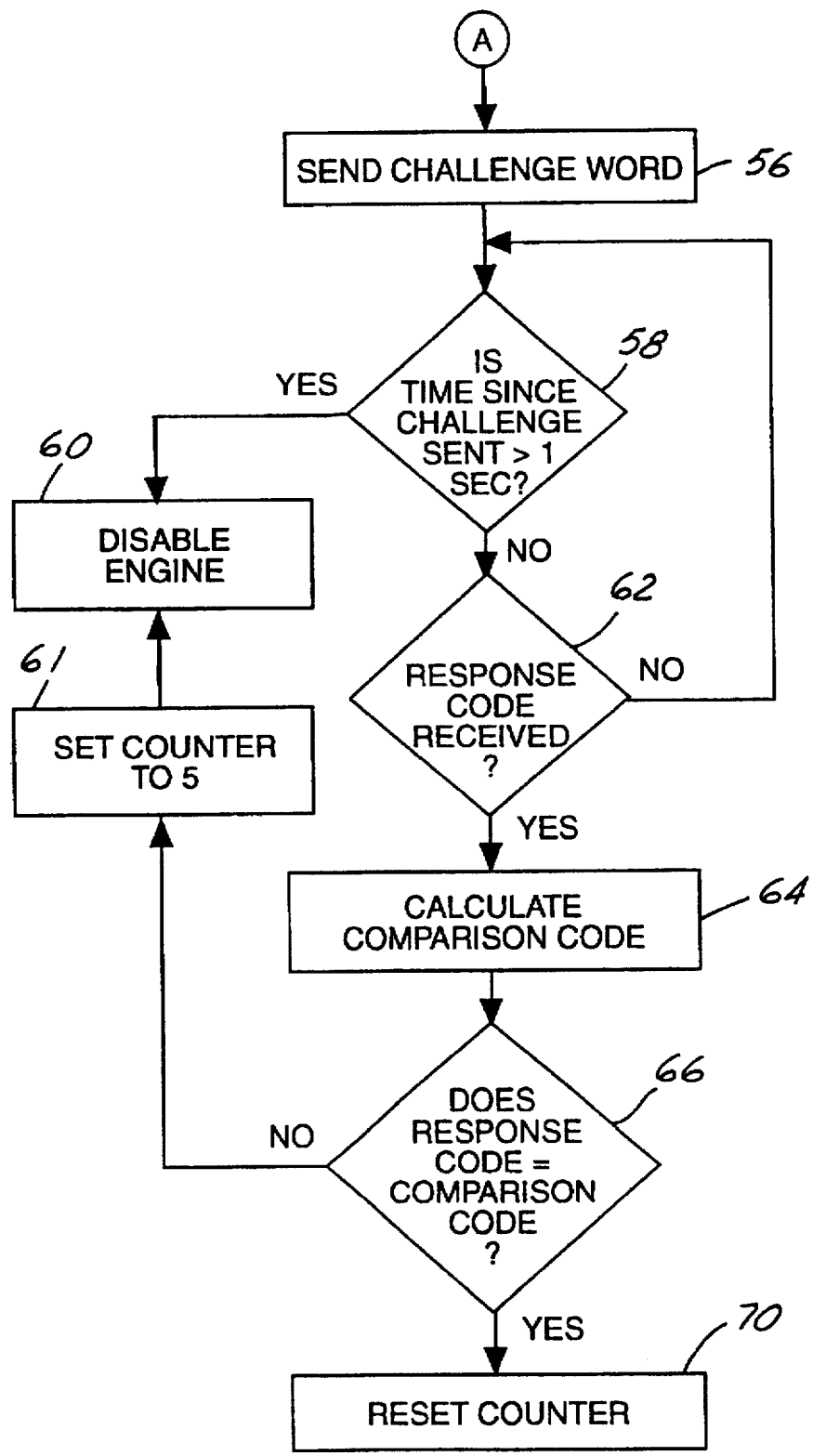

Referring now to the flowcharts of FIGS. 2A and 2B, in step 34, a key is inserted into the lock switch and is rotated to the "start" or "on" position to provide power to the theft control module and the electronic engine controller. The theft control module automatically beings its interrogation of the security code stored in the key transponder. In step 36, a check is made by the electronic engine controller to determine whether either the number of attempts to start the engine exceeds a predetermined number (preferably 4) or the keep-alive memory has been cleared by removal of the vehicle battery. If either condition is true, engine operation is disabled in step 38 by removing power supplied to the engine running components. Four unsuccessful attempts at starting the engine are allowed so that some small amount of sporadic operation of the electronic engine controller or the theft control module does not prevent a quick engine start on the next attempt. Even after the four unsuccessful attempts, a user with an authorized key will still be able to start the engine after the key is interrogated and a match is found. On the other hand, limiting the number of attempts prevents an unauthorized user from moving the vehicle very far.

After the engine is disabled in step 38, the attempted start counter is incremented in step 42. If the attempted start count did not exceed 4 and keep-alive memory was not cleared, then the engine running components are supplied with power in step 40. Then the attempted start counter is incremented in step 42.

Beginning in step 44, electronic engine controller 14 requests theft control module 10 to send the theft status condition which identifies whether security codes from the key transponder and the theft control module match. For example, electronic engine controller 14 may send such a request every 100 to 200 milliseconds until it is received. Due to the variable charging conditions of the transponder, a variable time may be required in order for the theft control module to complete its task.

In step 46, the theft status condition is checked for one of three conditions: 1) waiting for response, 2) engine enable (security code okay), or 3) engine disable (security code not okay). In a wait mode while waiting for a response from the theft control module, engine speed is compared with a typical engine speed of about 400 RPM in step 48 as an indication of whether the engine has successfully started. If engine speed is not over 400 RPM, then step 44 is repeated. If the engine has reached 400 RPM, then the length of time that the engine has been started is monitored in step 50. If the engine has not been started for more than 1 second, step 44 is repeated. One second represents the typical time it takes for transient electrical signals in the electrical system to significantly damp out. More reliable readings of the security code on the key can be taken after transient signals subside. If the engine has been started for more than 1 second but no response has yet been received from the theft control module, step 50 is followed by a disable sequence beginning with step 52. This situation is likely when, for instance, the connection from theft control module 10 to electronic engine controller is severed by tampering. In step 53, a confirmation signal is sent from the electronic engine controller to the theft control module.

If in step 46 the theft control module responds with an engine disable code because of attempted use by an unauthorized key, then the attempted start counter is set to 5 in step 51 so that no further engine starts will be allowed without first detecting an authorized key transponder. In step 52, the engine is disabled by the electronic engine controller removing power from the engine running electrical components, e.g., shutting down the fuel pump and fuel injectors, and the confirmation signal is sent in step 53.

If the theft status condition indicates an engine enable condition in step 46, then a further security check is conducted. The electronic engine controller sends a challenge word to the theft control module in step 56. The challenge word is a code having a certain number of bits. The challenge code is operated on by the theft control module using a secret algorithm and a response code is sent back to the electronic engine controller.

In step 58, the time since the challenge word was sent from the electronic engine controller to the theft control module is checked. If a time greater than a predetermined time (e.g., one second) has elapsed, the engine is disabled in step 60. A time longer than the predetermined time is likely to occur if the system has been tampered with.

If the time elapsed is less than one second, then a check as to whether a response code was received is made in step 62. If a response code has not yet been received, step 58 is again executed.

After a response code is received, the electronic engine controller calculates a comparison code using the same secret algorithm in step 64. Step 66 checks whether the response code equals the comparison code. If the comparison and response codes are not equal then the attempted start counter is set to 5 in step 61 and the engine running components are disabled in step 60. If the codes are equal, the attempted start counter is reset to 0 in step 70. If the engine running components are not already enabled, then they are also enabled by restoring power to them in this step.

As would be evident to one skilled in the art, several modifications of the invention may be made while still being within the scope of the appended claims. For example, the time periods and predetermined counter values may be varied to meet the needs of an individual system.

What is claimed is:

1. A method for operating a security system for an automotive vehicle having an engine including engine running electrical components and an electronic engine controller, said automotive vehicle including a lock switch having a selected position providing power to said engine running electrical components to run said engine, said lock switch being movable by a key having a predetermined cut, said key further containing a first security code stored electronically, said electronic engine controller comprising a counter for counting an attempted start count, said security system having a theft control module operatively connected between said electronic engine controller and said lock switch, said theft control module having a memory storing a second security code and having means for communicating with said key to retrieve said first security code, said method comprising the steps of:

using said key to place said lock switch in said selected position;

comparing said attempted start count to a predetermined number;

disabling said engine from running if said attempted start count exceeds said predetermined number, otherwise enabling starting of said engine;

incrementing said attempted start count;

operating said theft control module to interrogate said key for said first security code;

receiving said first security code into said theft control module;

comparing said first security code with said second security code;

if said first security code does not equal said second security code, then disabling said power to said running electrical components and setting said attempted start count to be greater than or equal to said predetermined number;

if said first security code equals said second security code, then:

signaling said electronic engine controller of said equality;

generating a challenge code in said electronic engine controller;

transmitting said challenge code to said theft control module;

calculating a response code in said theft control module based on a secret algorithm operating on said challenge code;

transmitting said response code to said electronic engine controller;

receiving said response code in said electronic engine controller;

calculating a comparison code in said electronic engine controller based on said secret algorithm;

comparing said response code to said comparison code;

if said comparison code equals said response code then resetting said attempted start count and supplying power to said engine running electrical components;

if said comparison code does not equal said response code then disabling said power to said running electrical components and setting said attempted start count to be greater than or equal to said predetermined number; and if no response code is received within a predetermined time then disabling said power to said running electrical components.

* * * * *